(12) United States Patent
Fioroni

(10) Patent No.: US 6,877,938 B2
(45) Date of Patent: Apr. 12, 2005

(54) MACHINE-TOOL IN PARTICULAR WITH PARALLEL ARCHITECTURE ACCOMMODATING DEFORMED ARTICULATIONS

(75) Inventor: Claude Fioroni, Castres (FR)

(73) Assignee: Renault Automation Comau, Trappes Cedex (FR)

( * ) Notice: Subject to any disclaimer, the term of this patent is extended or adjusted under 35 U.S.C. 154(b) by 0 days.

(21) Appl. No.: 10/450,069

(22) PCT Filed: Dec. 4, 2001

(86) PCT No.: PCT/FR01/03865

§ 371 (c)(1),
(2), (4) Date: Nov. 10, 2003

(87) PCT Pub. No.: WO02/45903

PCT Pub. Date: Jun. 13, 2002

(65) Prior Publication Data

US 2004/0067117 A1 Apr. 8, 2004

(30) Foreign Application Priority Data

Dec. 8, 2000 (FR) .......................................... 00/16212

(51) Int. Cl.$^7$ ............................................... B23C 1/12
(52) U.S. Cl. ................... 409/201; 409/235; 409/211; 74/490.05; 74/490.01
(58) Field of Search ............................... 409/235, 201, 409/211, 216, 204; 16/221; 411/52, 53, 54, 65, 66, 73, 74; 74/490.05, 490.08, 490.03, 490.01; 403/52, 53, 54, 65, 66, 73, 74; 901/22, 23; 408/236

(56) References Cited

U.S. PATENT DOCUMENTS 4,988,244 A * 1/1991 Sheldon et al. ............. 409/235
5,388,935 A * 2/1995 Sheldon ..................... 409/201
5,787,758 A * 8/1998 Sheldon ..................... 409/201
5,832,783 A * 11/1998 Sheldon ..................... 409/235
5,857,815 A * 1/1999 Bailey et al. ............... 409/201
5,960,672 A * 10/1999 Pritschow et al. ........ 74/490.07
6,048,143 A * 4/2000 Chang et al. ............... 409/201
6,099,217 A * 8/2000 Wiegand et al. ............ 409/201
6,155,758 A * 12/2000 Wieland et al. ............. 409/201
6,161,992 A * 12/2000 Holy et al. ................. 409/201
6,540,458 B1 * 4/2003 Ponisch ..................... 409/201
6,575,676 B2 * 6/2003 Wang et al. ................ 409/201

FOREIGN PATENT DOCUMENTS

DE 19836624 C1 * 2/2000 ............. B23C/1/00

* cited by examiner

Primary Examiner—Erica Cadugan
Assistant Examiner—Dana Ross
(74) Attorney, Agent, or Firm—Pendorf & Cutliff

(57) ABSTRACT

The invention concerns a very high-speed machining machine-tool (M) consisting of a parallel structure including link bars (100) whereof one first end (110) is linked to a mobile member (200) supporting at least a tool and whereof the second end (120) is linked to at least means (300) setting it in motion relative to a frame (B). The said machine-tool is characterized in that the linkages (400) to the ends (100 [sic, should be 110. -Translation Editor] and 120) of the said bars (100) consist in an association of fictitious pivots (410, 420, 430) so as to form a joint whereof the degrees of freedom enable the parallel structure to be set in motion. The said feature enables to avoid all drawbacks related to ball linkages. The invention is applicable to high-speed machining.

8 Claims, 2 Drawing Sheets

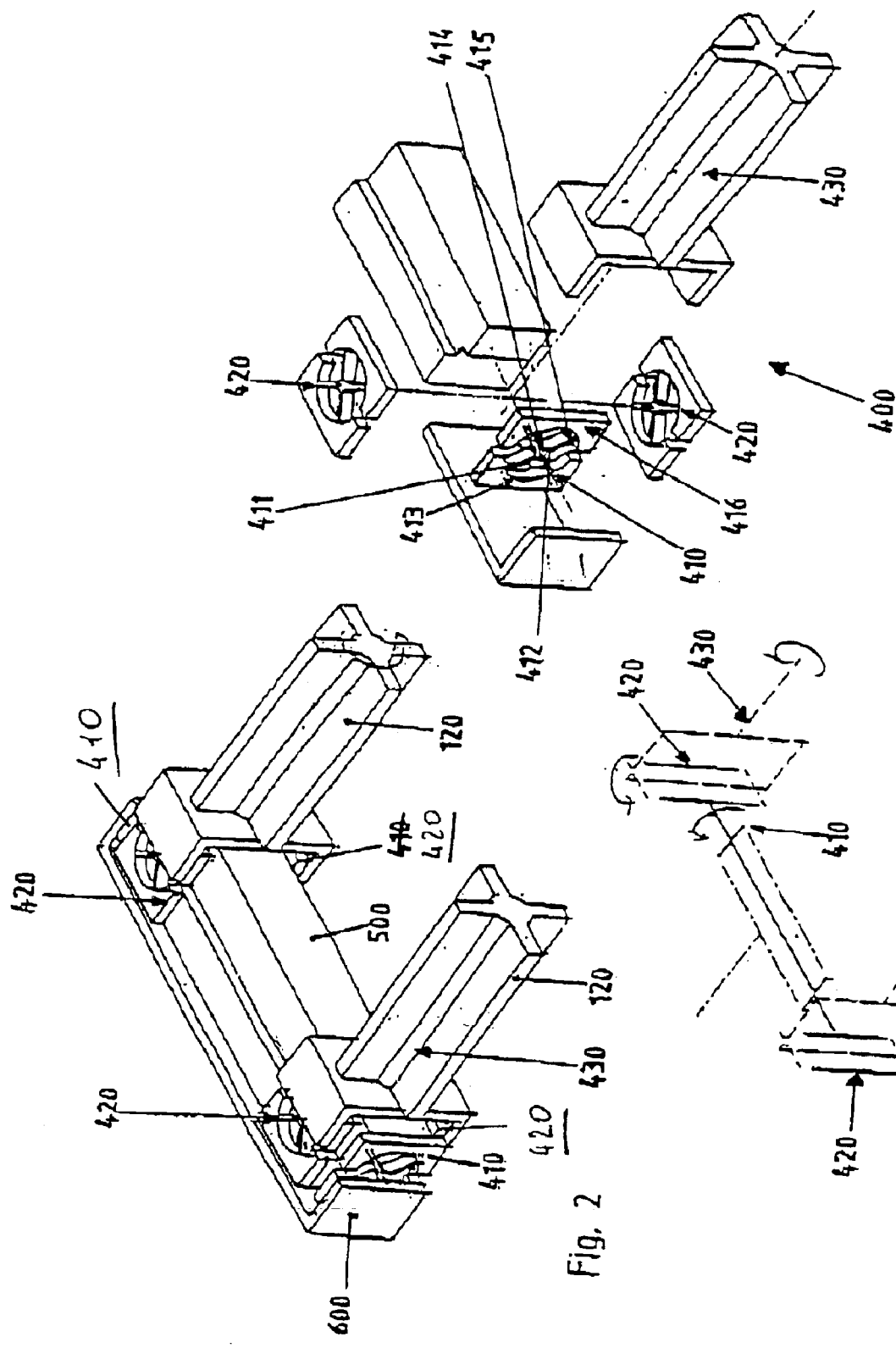

MACHINE-TOOL IN PARTICULAR WITH PARALLEL ARCHITECTURE ACCOMMODATING DEFORMED ARTICULATIONS

CROSS REFERENCE TO RELATED APPLICATION

This application is a national stage of PCT/FR01/03865 filed Dec. 7, 2001 and based upon French Application 00/16212 filed Dec. 8, 2000 under the International Convention.

AREA OF APPLICATION OF THE INVENTION

The present invention relates to the field of machine-tools for very high-speed machining with a parallel structure and, specifically, to adaptations that permit guidance of the constituting elements of the said parallel structure.

DESCRIPTION OF THE PRIOR ART

A machine-tool for very high-speed machining as described in Patent Application No. WO 99/61198 in the name of the Applicant and illustrated in FIG. 1, classically comprises bars which link the driving means and the mobile member to be set in motion. Within the framework of the machine-tool illustrated, the function of these bars is to assure transformation of movements in three parallel directions into movements in three orthogonal directions.

In order to permit and guide the plurality of movements which may occur in such a parallel structure, the bars are classically equipped, at their ends, with joints that permit rotation along at least two axes. Nevertheless, since the displacement has to be realized isostatically, the multiplication of these linkages requires joints of the universal type to permit additional rotation the axis of the said bars.

These linkages or joints are produced today by means that utilize rolling balls. Now, these means have several disadvantages, the major ones of which are described below.

Ball linkages require constant maintenance and within the framework of very high-speed machining they can provide only a limited lifetime due to the fact of creation of a larger and larger play during operation. As a matter of fact, very high-speed machining has the disadvantage of causing premature wear of the classical guidance means by surface corrosion (tribological degradation).

This is in part due to the high dynamic stresses imposed by the very high-speed machining which causes a high-frequency vibrational phenomenon on the parallel structure and therefore on the elements constituting it.

This premature wear is difficult to express in quantitative terms and requires the users of such machine tools to change the pieces that are liable to be worn, regularly and prematurely. Such a replacement of all the joints of a machine-tool for high-speed machining with parallel structure implies immobilization of the structure, stopping the chain of manufacture in which it participates, carrying out new precision tests before start-up, etc.

The precision criteria in the machining carried out today, such as the lack of rigidity of the parallel structure due to wear of the classical means of guidance or linkage is difficult to tolerate. At the same time, the time of immobilization and the cost of replacement inherent in this type of linkage and application have a considerably severe effect on the operating budget of such a machine-tool.

The absence or slowing down of the wear and rigidity of the linkages are criteria to which fictitious pivots respond.

These joints, frequently limited to a single degree of freedom (a rotation), utilize the controlled deformation of a material to provide the required angular freedom. Thus, for example, the joints described in Patent Applications EP 0 459 057, FR 2 738 602, DE 195 39 581, CH 375 959, U.S. Pat. No. 2,950,079, FR 2 666 630, U.S. Pat. No. 4,297,904 define fictitious pivots, based on the deformation of the linkage zones between a fixed part and a mobile part.

DESCRIPTION OF THE INVENTION

Starting from the state of the art and from pre-established specifications, the Applicant carried out a research which led to the conception and realization of a machine-tool which adopts a technological solution that permits elimination of the disadvantages inherent in the lack of rigidity of parallel structures, by exploiting and adapting the characteristics of fictitious pivots.

This machine-tool for very high-speed machining is of the type consisting of a parallel structure comprising linkage bars, the first end linked to a mobile member supporting at least one tool and the second end linked to at least one means for setting in motion relative to a frame.

According to the main characteristic of the invention, the linkages at the end of the said bars are constituted by a combination of fictitious pivots to form a joint, the degrees of freedom of which enable the parallel structure to be set in motion.

The utilization of a combination of fictitious pivots is particularly advantageous in this type of linkage functions by deformation of material and thus permits a greater rigidity of the joint while still permitting movement. Similarly, a combination of fictitious pivots permits not only the said movements with a greater rigidity but also allows torsion, which avoids the utilization of universal-type joints.

Moreover, this type of joint does not require special maintenance due to the fact that the joint is not made by guidance or friction. No tribological degradation is to be feared, contrary to the classically used ball linkages. The consequences of these characteristics is that the machine-tool of the invention will have better precision than the already existing ones, and that its maintenance, as well as its operation, will be less expensive, both with regard to time and material.

This main characteristic of the invention does not constitute a simple combination or an evident combination of two known devices. As a matter of fact, it is the new criteria of precision machining at very high speeds and the decrease of the maintenance costs of specifications which led the Applicant to carry out these investigations. Also, the need to which the main characteristic of the invention responds is fundamentally new, The utilization of fictitious pivots for the guidance of arms constituting the parallel structure of a machine-tool for very high-speed machining also represents great novelty in that the designers in the field of machine tools have a tendency to design based on known and mastered links. Thus, the realization of joints combining a plurality of fictitious pivots also institutes a break from the normal reasoning processes of machine-tool designers.

Moreover, this characteristic does not simply combine a fictitious pivot with a parallel structure but requires a combination of fictitious pivots in order to satisfy the specific linking criteria established by the intended application, namely, enables the setting in motion and isostatic guidance of the arms constituting a parallel structure, which require more than one degree of freedom.

The invention also concerns a deformation joint designed for this machine-tool and which can also be used separately.

The fundamental concepts of the invention having been exposed above in their most elementary form, other details and characteristics will follow more clearly from reading the description which follows in relation to the attached drawings, giving, as a nonlimiting example, an embodiment of a machine-tool and of a deformation joint according to the invention.

BRIEF DESCRIPTION OF THE DRAWINGS

FIG. 2 is a schematic perspective view of an embodiment of a joint of a machine-tool according to the invention;

FIG. 3 is an exploded schematic perspective view of a detail of the joint of FIG. 2 and FIG. 4 is a kinematic scheme of the joint of FIG. 2.

DESCRIPTION OF PREFERRED EMBODIMENTS

Figure 1:
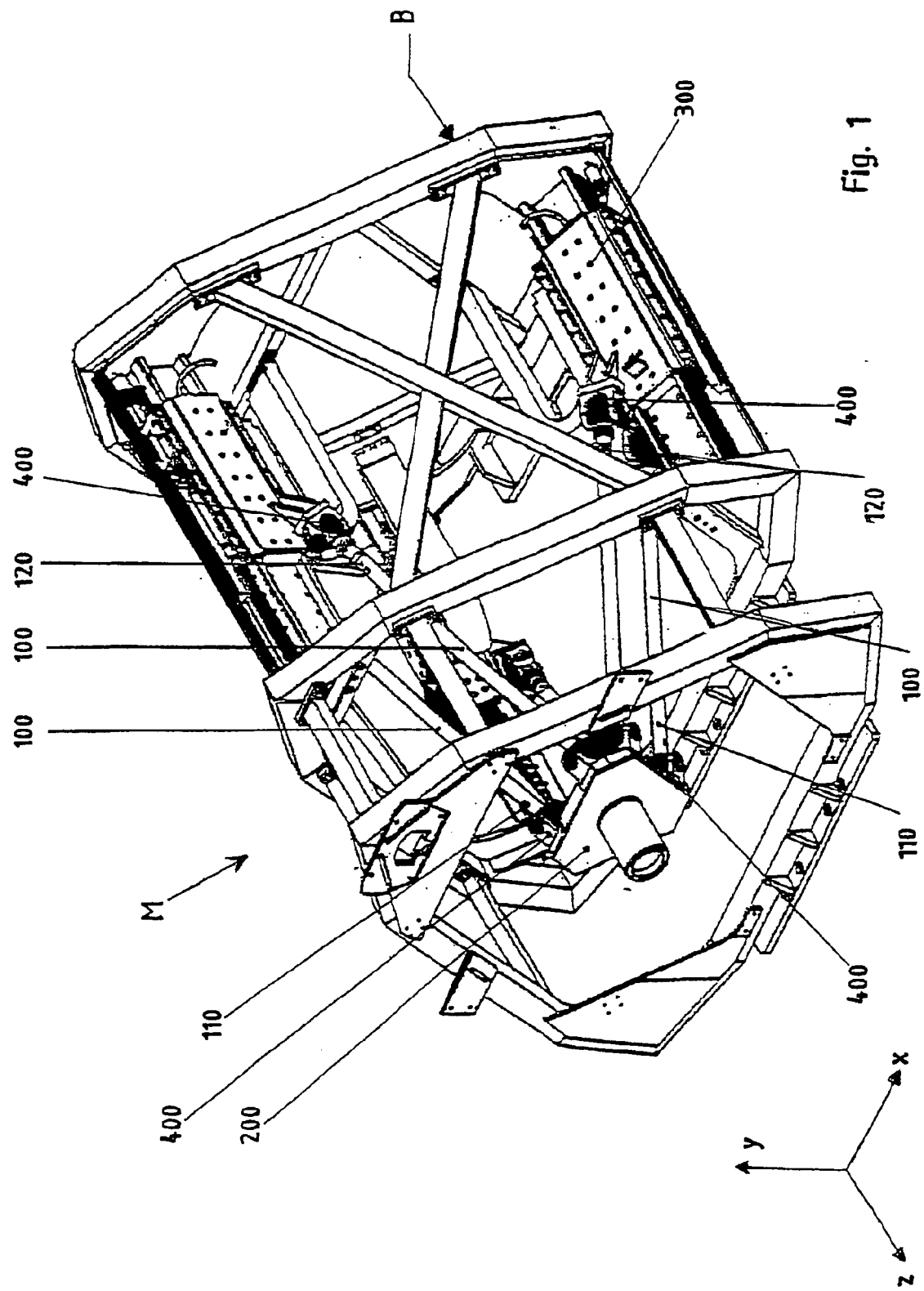
FIG. 1 is a perspective view of a machine tool with parallel structure of the technological background.

As illustrated in the drawing of FIG. 1, the machine-tool for very high-speed machining referenced M in its entirely is of the type comprising linkage bars 100 whereof one first end 110 is connected to a mobile member 200 supporting at least one tool (not shown) and whereof the second end 120 is connected to at least one driving means 300 relative to a frame referenced B. According to the illustrated embodiment, there are six of the said bars 100 which are linked through their second end 120, two by two, to driving means 300. There are three driving means. The first ends 110 are linked, two by two, to the same side of the mobile member 200, which is in the form of a triangular plate. Each side accepts the first end 110 of the two linked bars 100. Within the nonlimiting embodiment of the machine-tool M illustrated, the parallel architecture was designed so that the separate or concerted movement of the three driving means 300 along axis Z permits rectilinear displacement along axes X, Y and Z of the mobile member 200.

According to the invention, linkage 400 at the ends of the said bars 100 are constituted by a combination of fictitious pivots to form a joint, the degrees of freedom of which permit setting the parallel structure in motion.

Although this characteristic is an ideal characteristic, it is possible for the parallel structure to be a mixed structure, namely, that only a part of the said linkage 400 is produced by a combination of fictitious pivots. As a matter of fact, in order to reach the required rigidity and consequently the required precision, it is possible that a limited number of joints 400 with fictitious pivots will be sufficient.

As illustrated in more detail in the drawing of FIG. 3, each linkage 400 is formed by three fictitious pivots 410, 420, 430, the axes of which are perpendicular to one another.

According to a particularly advantageous characteristic of the invention, the profile of the said linkage bars 100 is preformed so that it will accept a torsional deformation, without reaching its elastic limit, so that one of the fictitious pivots that forms the joint is realized by the torsional elasticity of the bar 100 or the end of bar 120 or 110 itself. This embodiment of the fictitious pivot is particularly useful within the framework of the degree of freedom in rotation around the longitudinal axis of linkage bars 100, which until now was endowed with a "universal" joint. Thus, according to the non-limiting embodiment which is illustrated, the fictitious pivot 430 is formed by the end 110 or 120 of the bar 100, which adopts a profile that permits torsion according to a limited number of degrees. This linkage bar 100 has at least on its end 110 or 120 the profile illustrated in the form of a cross, which is particularly suitable for accepting torsional stresses. According to the technological choice envisaged by the Applicant, bar 100 or its end are profiled so that it accepts a rotation of about a single degree of freedom.

When the number of degrees necessary for the rotation is larger, another embodiment which is illustrated, but is non-limiting, the fictitious pivots 410, 420 are formed by at least one deformable subassembly comprising a cross having a first pair of arms and a second pair of arms. The ends of the first pair of arms are linked by a first plate and the ends of the second pair of arms are linked by a second plate. More precisely, the fictitious pivot 410 takes the form of a cross with four arms 411–414. The ends of the first pair of arms 411 and 412 are linked through a first plate 413 and the ends of the second pair of arms 414 and 415 are linked by a second plate 416.

As illustrated in FIG. 2 and FIG. 3, the pivot joint is carried on by a fictitious pivot. Consequently, there are two fictitious pivots carrying on the rotation along the horizontal axis and there are two fictitious pivots carrying on the rotation along the vertical axis for each bar.

As illustrated in the kinematic scheme given in the drawing of FIG. 4, the axes of these fictitious pivots are perpendicular to one another. According to the illustrated non-limiting embodiments of fictitious pivots, the latter assures a rotary linkage along about 20 degrees.

Moreover, as illustrated in FIG. 2, when the machine-tool is of the type illustrated in FIG. 1, where the setting in motion of the mobile member 200 is performed by means of three pairs of arms 100, each pair being linked at one of their ends 120 to a single driving means 300, the said linkage bars 100 forming a pair are linked to a same first mobile crosspiece 500, which is linked by at least one fictitious pivot 420 and/or 410 to a second crosspiece 600, attached to the said driving means 300 (not illustrated in FIG. 2).

The invention also concerns the deformation joint adapted to a machine-tool of the type illustrated but it can be applied to other machines or devices. This joint is characterized by the fact that it is formed by a plurality of fictitious pivots, the associated degrees of freedom of which permit quasi-functioning as a trunnion. As a matter of fact, the joint imagined by the Applicant has the rigidity characteristics and the absence of the necessity of maintenance due to tribological degradations, since the fictitious pivots constituting it provide joints without friction.

It is understood that the machine-tool and the deformation joint, which were described and represented above, were aimed at disclosure rather than limitation. Naturally, various arrangements, modifications and improvements can be provided to the example given above without departing from the framework of the invention, taken in its broadest aspects and spirit.

What is claimed is:

1. A machine-tool (M) for very high-speed machining comprising:

a parallel structure comprising link bars (100), each linking bar having a first end and a second end, wherein the first end (110) of each link bar is linked to a mobile member (200) adapted to support at least one tool, and wherein the second end (120) of each link bar is linked to at least one driving means (300) with respect to a frame (B), said bars being equipped at the first and second end with a linkage (400) that permits a rotation along at least two axes, wherein the linkage (400) at the ends (110,120) of the bars are constituted by a combination of fictitious pivots (410, 420, 430) to form a joint, the degrees of freedom of which permit setting the parallel structure in motion, and wherein the profile of said link bars (100) allows torsional deformation without reaching their elastic limit, so that one of the fictitious pivots (430) forming the linkage (400) is formed by the elasticity of the bar (100) itself.

2. A machine-tool (M) according to claim 1, wherein the linkage (400) is form in part by a combination of fictitious pivots.

3. A machine-tool (M) according to claim 1, wherein each linkage (400) is formed by three fictitious pivots (410, 420, 430), wherein the axes of the fictitious pivots are perpendicular to one another.

4. A machine-tool (M) according to claim 1, wherein the fictitious pivots (410, 420, 430) are formed by at least one deformable subassembly comprising a cross having a first pair of arms and a second pair of arms, wherein the ends of the first pair of arms (411 and 412) are linked to a first plate (413) and wherein the ends of the second pair of arms (414 and 415) are linked to a second plate (416).

5. A machine-tool (M) according to claim 1, wherein the link bar (100) has at least at its end (110 or 120) a profile adapted to accept torsional stresses.

6. A machine-tool (M) according to claim 1, wherein the link bar (100) has at least one of its ends (110 or 120) a profile in the form of a cross, which is particularly suitable for accepting torsional stresses.

7. A machine-tool (M) according to claim 1, wherein the axes of the fictitious pivots (410, 420, 430) are perpendicular to one another.

8. A machine-tool (M) according to claim 1, wherein the setting in motion of the mobile member (200) is carried out with the aid of three pairs of arms (100), each of the pairs of arms being linked at one of their ends (120) to a single means of setting in motion (300), wherein said pairs (100) are linked to the same mobile crosspiece (500), which is linked by at least one fictitious pivot (410, 420) to a second cross piece (600) attached to said means of setting in motion (300).

* * * * *